Dec. 19, 1961          A. O. LUNING          3,013,413

SHOCK-ABSORBING, TORQUE-TRANSMITTING DEVICE

Filed June 3, 1957                          2 Sheets-Sheet 1

INVENTOR

Alfred O. Luning

BY

ATTORNEY

Dec. 19, 1961　　　A. O. LUNING　　　3,013,413
SHOCK-ABSORBING, TORQUE-TRANSMITTING DEVICE
Filed June 3, 1957　　　　　　　　　　　　　2 Sheets-Sheet 2
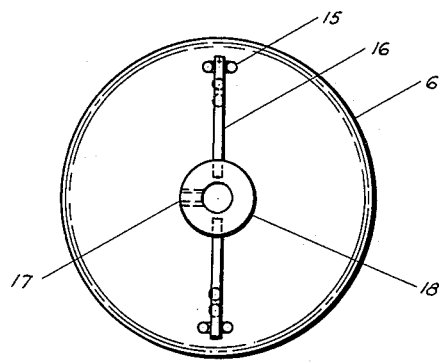
FIG 5
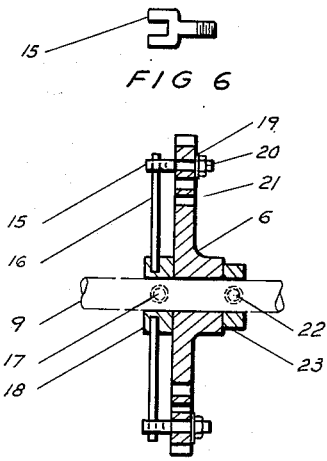
FIG 6
FIG 7
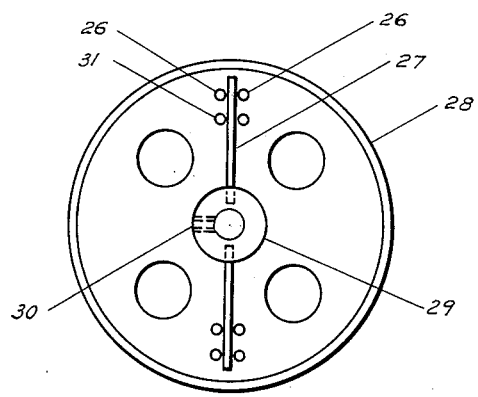
FIG 8
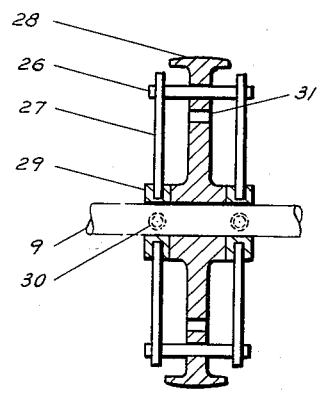
FIG 9
INVENTOR
Alfred O. Luning
BY
ATTORNEY

United States Patent Office 3,013,413
Patented Dec. 19, 1961

3,013,413
SHOCK-ABSORBING, TORQUE-TRANSMITTING
DEVICE
Alfred O. Luning, Riverdale, Md.
(2611 S. 8th St., Apt. 581A, Arlington 4, Va.)
Filed June 3, 1957, Ser. No. 663,033
12 Claims. (Cl. 64—27)

This invention relates to a simple, shock-absorbing, torque-transmitting device which may be easily applied or adapted to virtually any kind of rotating or oscillating object such as a gear or a pulley, a sprocket, a drum, a disc, a shaft coupling, etc.

It is an object of this invention to provide a torque-transmitting device capable of a variable torsional spring rate.

Another object of this invention is to provide a torque-transmitting device which can be easily coupled and de-coupled to standard rotating or oscillating objects as mentioned above.

Further objects of the invention will become apparent from the description that follows and the accompanying illustrations.

A number of shock-absorbing, torque-transmitting objects such as wheels, gears, pulleys and couplings employ rubber in compression or shear to transmit torque loads. The introduction of rubber to transmit torque in the aforementioned parts usually requires bonding and curing of the rubber to metal parts, and generally requires considerable skill, know-how, special tools and dies. In addition, such torque transmitting devices are more often inherently limited to one torsional spring rate; their rubber spring elements are made integral with other parts such that the rubber elements cannot be removed or replaced. Also, rubber and rubber compounds age relatively fast, and in time become hard losing their initial resiliency.

Another device used in gears, pulleys, and other rotating objects to make them shock-absorbing is the conventional coil spring. Usually the application of coil springs to torque transmitting objects is so singular and unique that, once made, little or no variation is possible in the torsional spring rate of the object moreover, adaptation of the coil springs from its original application in a gear, for example, to a pulley, would not normally be possible.

The invention described herein will, in most instances overcome the limitations associated with the shock-absorbing, torque-transmitting devices using the materials mentioned above.

For convenience and the purpose of illustration the torque-transmitting device, as applied to a gear and a pulley wheel, is shown in the accompanying figures, though it be intended that this invention apply also to other similar torque-transmitting objects hereinbefore recited.

Figure 1:
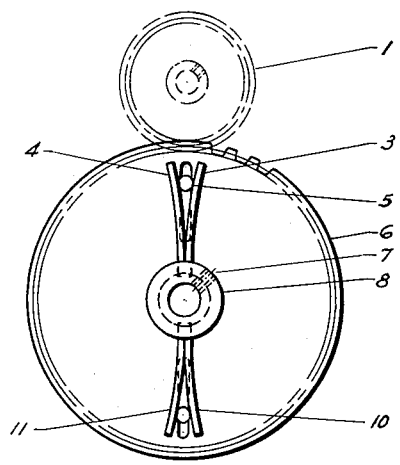
FIG. 1 is an elevation of a pair of enmeshed gears showing the shock-absorbing, torque-transmitting device of this invention applied on the lowermost gear.
Figure 3:
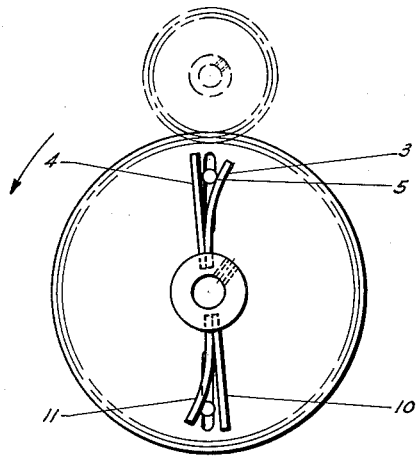
Figure 4:
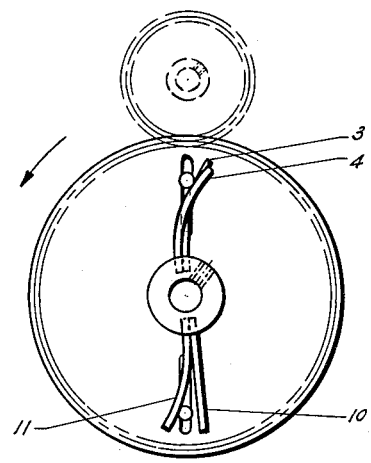

FIG. 3 illustrates the gears of FIG. 1 in a loaded condition. FIG. 4 shows a further possibility of applying the torque device on the gears of FIG. 1. FIG. 5 and FIG. 7 illustrate respectively an elevation and a sectional view of a second embodiment of the shock absorbing torque-transmitting device as applied to a gear. FIG. 8 and FIG. 9 illustrate respectively an elevation and a sectional view of a third embodiment of the torque-transmitting device of this invention in which the device is applied on a pulley wheel.

Figure 2:
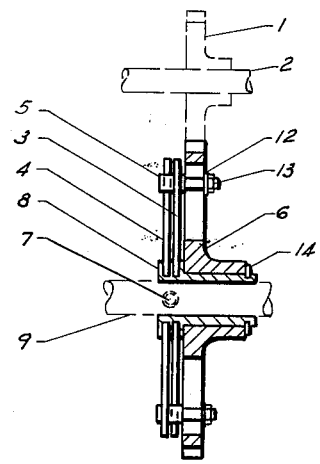
FIG. 2 is a sectional view of FIG. 1.

FIGS. 1 and 2 illustrate a preferred embodiment of this invention.

In FIGURES 1 and 2, gear 1 on shaft 2, is shown meshing with gear 6 mounted on bushing 8, which in turn is mounted over a shaft 9 and secured thereon by setscrew 7. In gear 6 are two radially-placed, slotted holes diametrically opposite provided to accommodate shouldered pins 5. Pins 5 may be adjusted radially in the slots in gear 6 and locked in place thereon by a nut 12 and washer 13 screwed over one end. Gear 6 is mounted free to rotate on bushing 8. A shoulder at one end of bushing 8 and a conventional retaining C-ring, 14, in a groove in the other end secures bushing and gear together. Radiating from bushing 8 are four torque bars, 3 and 4, 10 and 11, which are cantilever springs shown engaged on two sides of pins 5. It is apparent from the construction of FIGS. 1 and 2 that all parts of the torque transmitting apparatus are integrally assembled as a unit that thereby the entire assembly may be assembled over shaft 9 and adjusted thereon as a unit, and also dissassembled from shaft 9 as a unit.

FIGURE 3 shows the relative position of torque bars and gear 6 when a counterclockwise torque, as indicated by the arrow, is applied to shaft 9. Torque bars 3 and 11 absorb load shock and transmit the torque through pins 5 to gear 6 and hence to gear 1.

FIGURE 4 shows two torque bars 3 and 4 acting in unison behind pin 5 on the top half of gear 6, while bar 11 exerts torque in unison on the bottom pin 5. This illustrates the possibility of obtaining a different torsional spring rate in the clockwise and counterclockwise directions. The torsional spring rate of the device can be varied further by (a) changing the radial location of pins 5, (b) by introducing fewer or greater numbers of torque bar and pin elements into the assembly, (c) by employing torque bars of materials possessing different moduli of elasticity, and (d) by using bars having different section moduli by virtue of possessing different size cross-sections.

FIGURES 5 and 7 are similar to FIGURES 1 and 2 except that torque bars 16 project from a collar 18 which is locked to shaft 9 by a set screw 17. Collar 23, secured to shaft 9 by a setscrew 22, together with 18, secure gear 6 against axial movement, but permit it to rotate freely on shaft 9. Six holes 21, are radially placed in gear 6 to permit different radial locations for a Y-shaped pin 15 detailed in FIG. 6. Pin 15 is secured in holes 21 by a washer 19 and nut 20.

FIGS. 5 and 7 show that by employing Y-shaped pins to engage the torque bars, each torque bar is capable of absorbing and transmitting sudden torque loads in both the clockwise and counterclockwise directions. The spring rate of the assembly can be varied by placing pins 15 in different holes 21, or by varying the number of engaging bars and pins, or by employing torque bars of different materials and sizes.

FIGURES 8 and 9 illustrate a pulley 28, to which is adapted the shock-absorbing, torque-transmitting device. A double set of torque bars 27 are arranged in identical collars 29, which are in turn secured to shaft 9 by setscrews 30. The collars are placed on each side of the pulley to transmit torque loads, and to serve in positioning axially the free-moving pulleywheel on shaft 9. Two straight pins 26 on each side of torque bars 27, are mounted in holes 31 through the web of pulley 28. Each pin engages a torque bar on opposite sides of the pulley. Eight holes 31, are provided in the pulley for locating pins 26 in different radial positions that the torsional spring rate of the assembly be made variable by engaging the torque bars at different points along their length.

The torsional spring rate of the pulley wheel assembly may be varied further by using a fewer or greater number of torque bars and pins, by varying the material used in making the bars, and by using bars of different sizes.

It can be appreciated that the collar supporting the torque bars in each case may be secured to the shaft by conventional means other than by setscrew as employed herein; and that various other combinations of torque bar and pin arrangements not shown are possible.

In FIG. 7 it can be appreciated that the torque-transmitting device becomes a flexible shaft coupling when shaft 9 is cut into two parts between collar 18 and item 6; and with the fastening of item 6 to shaft 9 by setscrews, collar 23 may then be eliminated. Item 6, illustrated as a gear, need be only a hubbed disc when used as a component of a shaft coupling.

Having thus described my invention I make the following claims:

1. A resilient torque-transmitting coupling comprising a driving member, a collar affixed to said driving member, one or more cantilever springs secured to said collar and extending radially outward, a driven member rotatably mounted on said driving member, pin type projections axially extending from said driven member, said springs engaging said projections to resiliently transmit torque from said driving member to said driven member, means to secure said driven member in close proximity to said collar, means to vary the axial position of said driven member upon said driving member, and means to vary the torsional spring rate of said torque-transmitting coupling.

2. A resilient torque-transmitting coupling as claimed in claim 1 wherein said means to secure said driven member in close proximity to said collar comprises a second collar similar to said collar set forth in claim 1, said second collar affixed to said driving member adjacent said driven member and opposite said collar set forth in claim 1, cantilever springs secured to said second collar and extending radially outward, pin type projections axially extending from said driven member, said springs engaging said projections to resiliently transmit torque from said driving member to said driven member.

3. A resilient torque-transmitting coupling as claimed in claim 1 wherein said cantilever springs are closely arranged together on said collar in one or more groups in such manner that said springs of a group are adaptable to be engaged singularly and plurally with one of said pin type projections.

4. A resilient torque-transmitting coupling as claimed in claim 1 wherein said cantilever springs are closely arranged on said collar in one or more groups such that said springs of a group are adaptable to be engaged with said pin type projections singularly and plurally in the clockwise, and in the counter clockwise directions respecting rotation of said coupling providing thereby means to resiliently transmit torque in either of said directions, and means to vary the torsional spring rate of said coupling in either of said directions.

5. A resilient torque-transmitting coupling as claimed in claim 1 wherein said cantilever springs are closely arranged together on said collar in one or more groups in such manner that said springs are adaptable to engage said pin type projections simultaneously in substantially opposite directions that thereby means is provided to resiliently preload said torque-transmitting coupling simultaneously in the clockwise and counter clockwise directions.

6. A resilient torque-transmitting coupling as claimed in claim 1 wherein said driven member contains a plurality of holes axially oriented thereon at different locations from the center thereof said holes adaptable to accommodate said pin type projections providing thereby means to vary the location of said projections extending from said driven member relative to the center thereof, and providing means therein to vary the torsional spring rate of said coupling.

7. A resilient torque-transmitting coupling as claimed in claim 1 wherein said pin type projections comprise forked members, said cantilever springs cooperable between said forked members wherein said members are engageable with said springs at a plurality of locations substantially opposite thereon providing means thereby to resiliently transmit torque in either the clockwise or the counter clockwise directions respecting rotation of said coupling.

8. A resilient torque-transmitting coupling as claimed in claim 1 wherein said driving member comprises a shaft through which torque is transmitted to said driven member, said shaft being independent and separable from said driven member said collar and said springs, wherein by virtue thereof means is provided to assemble, disassemble, and axially adjust the position of said driven member, said collar and said springs relative to said driving member.

9. A resilient torque-transmitting coupling as claimed in claim 1 wherein said pin type projections extending from said driven member are grouped in pairs one opposite the other, said cantilever springs extending between said projections and cooperable therewith whereby means is provided to resiliently transmit torque from said driving member to said driven member in either the clockwise direction or the counterclockwise direction respecting rotation of said coupling.

10. A resilient torque-transmitting coupling comprising a shaft driving member, a flanged collar having a central hole therethrough, said collar mounted through said hole over said shaft and secured thereto, a driven member rotatably mounted over said collar and secured from axial displacement thereon, cylindrical pins extending axially from said driven member, cantilevered wire springs secured to said collar radiating outward, said springs cooperable with said pins to resiliently transmit torque from said shaft to said driven member, and means to vary the torsional spring rate of said torque-transmitting coupling.

11. A resilient torque-transmitting coupling as claimed in claim 1 wherein said collar comprises a cylindrical flange intermediate said driving member and said driven member, said driven member rotatably mounted over said flange, and secured from axial movement thereon.

12. A resilient torque transmitting coupling as claimed in claim 1 wherein said driven member contains elongated holes adaptable to accommodate said pin type projections at various locations in said driven member whereby in said engagement of said cantilever springs and said pins to resiliently transmit torque, and means provided to change the torsional spring rate of said coupling.

References Cited in the file of this patent

UNITED STATES PATENTS

| | | |
|---|---|---|
| 729,649 | Nyberg | June 2, 1903 |
| 1,055,025 | Donnelly | Mar. 4, 1913 |
| 1,425,177 | Constable | Aug. 8, 1922 |
| 1,756,689 | Jenkins | Apr. 29, 1930 |
| 2,564,219 | Green | Aug. 14, 1951 |

FOREIGN PATENTS

| | | |
|---|---|---|
| 165,811 | Great Britain | July 11, 1921 |
| 349,027 | Great Britain | May 31, 1931 |
| 258,060 | Italy | Apr. 3, 1927 |